United States Patent
Wang (10) Patent No.: US 11,833,424 B2
(45) Date of Patent: Dec. 5, 2023

(54) IMAGE RENDERING METHOD AND APPARATUS, DEVICE AND STORAGE MEDIUM

(71) Applicant: TENCENT TECHNOLOGY (SHENZHEN) COMPANY LIMITED, Shenzhen (CN)

(72) Inventor: Zhiliang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 465 days.

(21) Appl. No.: 17/161,993

(22) Filed: Jan. 29, 2021

(65) Prior Publication Data

US 2021/0146247 A1 May 20, 2021

Related U.S. Application Data

(63) Continuation of application No. PCT/CN2020/112926, filed on Sep. 2, 2020.

(30) Foreign Application Priority Data

Sep. 11, 2019 (CN) .......... 201910859321.X (51) Int. Cl.
*A63F 13/52* (2014.01)
*G06T 11/00* (2006.01)
(52) U.S. Cl.
CPC ........... *A63F 13/52* (2014.09); *G06T 11/001* (2013.01); *G06T 2210/61* (2013.01)
(58) Field of Classification Search
None
See application file for complete search history.

(56) References Cited

U.S. PATENT DOCUMENTS 7,098,925 B1 8/2006 Lake et al.
10,074,193 B2 9/2018 Lobaugh et al.
(Continued)

FOREIGN PATENT DOCUMENTS

CN 103207728 A 7/2013
CN 104103089 A 10/2014
(Continued)

OTHER PUBLICATIONS

Japanese Office Action with English translation regarding 2021-555825 dated Sep. 12, 2022.
(Continued)

*Primary Examiner* — Ronald Laneau
(74) *Attorney, Agent, or Firm* — Crowell & Moring LLP (57) ABSTRACT

The present disclosure describes an image rendering method and apparatus, and a related device. The method includes obtaining, by a terminal device, a base image corresponding to a to-be-rendered picture. The terminal device includes a memory storing instructions and a processor in communication with the memory. The method also includes obtaining, by the terminal device, a picture effect indication array corresponding to the base image, the picture effect indication array comprising a picture effect indication value corresponding to a pixel of the base image; rendering, by the terminal device, the base image matching a screen size of the terminal device to obtain a base texture map; and performing, by the terminal device, rendering on the base texture map according to the picture effect indication array. The present disclosure may effectively reduce the quantity of times of drawing in an image rendering process and improve image rendering efficiency.

17 Claims, 6 Drawing Sheets

(56) References Cited

U.S. PATENT DOCUMENTS

| | | | |
|---|---|---|---|
| 2003/0052891 A1 | 3/2003 | Bragg et al. | |
| 2015/0348285 A1* | 12/2015 | Wang | G06T 3/40 |
| | | | 345/582 |
| 2015/0348315 A1 | 12/2015 | Wang et al. | |
| 2016/0217590 A1* | 7/2016 | Mullins | G06T 7/40 |
| 2021/0035369 A1* | 2/2021 | Wang | G06T 7/74 |
| 2021/0166467 A1* | 6/2021 | Zhang | G06T 15/503 |
| 2021/0274235 A1* | 9/2021 | Anderegg | H04N 21/2343 |

FOREIGN PATENT DOCUMENTS

| | | |
|---|---|---|
| CN | 104268922 A | 1/2015 |
| CN | 104966312 A | 10/2015 |
| CN | 106408523 A | 2/2017 |
| CN | 106485776 A | 3/2017 |
| CN | 108295467 A | 7/2018 |
| CN | 110115841 A | 8/2019 |
| CN | 110570505 A | 12/2019 |
| GB | 2514583 A | 12/2014 |
| JP | 2004-334661 A | 11/2004 |
| JP | 2011-215737 A | 10/2011 |

OTHER PUBLICATIONS

International Search Report and Written Opinion regarding PCT/CN2020/112926 dated Dec. 4, 2020, 12 pages.

Chinese Office Action with concise English translation regarding CN201910859321.X dated Aug. 27, 2020, 8 pages.

Tom McReynolds, "Programming with OpenGL: Advanced T e c h n i q u e s," SIGGRAPH '97 Course, Mar. 1, 1997, 273 pages.

Segal et al., "Fast Shadows and Lighting Effects Using Texture Mapping," SISGRAPH '92 Chicago, Computer Graphics, vol. 26, No. 2, Jul. 1, 1992, 4 pages.

Extended European Search Report regarding EP 20 862 745.5 dated Apr. 7, 2022, 9 pages.

* cited by examiner

IMAGE RENDERING METHOD AND APPARATUS, DEVICE AND STORAGE MEDIUM

RELATED APPLICATION

This application is a continuation application of PCT Patent Application No. PCT/CN2020/112926, filed on Sep. 2, 2020, which claims priority to Chinese Patent Application No. 201910859321.X, filed with the National Intellectual Property Administration, P.R. China on Sep. 11, 2019, both of which are incorporated herein by reference in their entireties.

FIELD OF THE TECHNOLOGY

This application relates to the field of image processing, and in particular, to an image rendering technology.

BACKGROUND OF THE APPLICATION

At present, many applications provide users with corresponding interactive services in the form of images. When the users are provided with the interactive services in the form of images, to attract attention of the users to pictures and improve the immersion feeling of the users, image rendering is often performed by superimposing various maps for achieving different picture effects.

Generally, a base image is specified for a to-be-drawn scene, the base image is divided into N base image blocks, and corresponding target base image blocks are drawn according to a size of a viewport. Similarly, each image having another picture effect, namely, effect map, is also divided into N corresponding effect map blocks, and according to the size of the viewport, the corresponding effect map blocks are separately superimposed and drawn on a target base image to achieve a final effect.

At present, in such an image rendering method, the base image and the each effect map both need to be individually divided into blocks and drawn. The quantity of times of drawing increases linearly with the increase in the quantity of effect maps and the quantity of blocks, and a larger quantity of times of drawing indicates a longer time of occupying resources of a processor. As a result, processing performance of the processor is affected. Most significantly, image rendering efficiency is directly reduced, and a response rate of an application based on image interaction is reduced correspondingly.

SUMMARY

Embodiments of this application provide an image rendering method and apparatus, a device and a storage medium, to effectively reduce the quantity of times of drawing in an image rendering process and improve image rendering efficiency.

The present disclosure describes a method for rendering an image. The method includes obtaining, by a terminal device, a base image corresponding to a to-be-rendered picture. The terminal device includes a memory storing instructions and a processor in communication with the memory. The method also includes obtaining, by the terminal device, a picture effect indication array corresponding to the base image, the picture effect indication array comprising a picture effect indication value corresponding to a pixel of the base image; rendering, by the terminal device, the base image matching a screen size of the terminal device to obtain a base texture map; and performing, by the terminal device, rendering on the base texture map according to the picture effect indication array.

The present disclosure describes an apparatus for rending an image. The apparatus includes a memory storing instructions; and a processor in communication with the memory. When the processor executes the instructions, the processor is configured to cause the apparatus to obtain a base image corresponding to a to-be-rendered picture, obtain a picture effect indication array corresponding to the base image, the picture effect indication array comprising a picture effect indication value corresponding to a pixel of the base image, render the base image matching a screen size of the apparatus to obtain a base texture map, and perform rendering on the base texture map according to the picture effect indication array.

The present disclosure describes a non-transitory computer-readable storage medium storing computer readable instructions. The computer readable instructions, when executed by a processor, are configured to cause the processor to perform obtaining a base image corresponding to a to-be-rendered picture; obtaining a picture effect indication array corresponding to the base image, the picture effect indication array comprising a picture effect indication value corresponding to a pixel of the base image; rendering the base image matching a screen size of a device to obtain a base texture map; and performing rendering on the base texture map according to the picture effect indication array.

The present disclosure also provides an image rendering apparatus, including:
  a first obtaining module, configured to obtain a specified base image in a to-be-rendered picture;
  a second obtaining module, configured to obtain a picture effect indication array corresponding to the base image, the picture effect indication array comprising a picture effect indication value corresponding to a pixel of the base image;
  a first rendering module, configured to render the base image to a render texture object matching a screen size of the device, to obtain a base texture map; and
  a second rendering module, configured to perform color rendering on the base texture map according to the picture effect indication array.

The present disclosure also provides a terminal device, including:
  a central processing unit (CPU), a graphics processing unit (GPU), a memory and a display;
  the memory being configured to store a computer program;
  the CPU being configured to execute the computer program, and control the GPU to execute the computer program in a case that picture rendering is required, to implement the image rendering method according to the first aspect; and
  the display being configured to display an image picture under the control of the GPU.

The present disclosure also provides a computer-readable storage medium, configured to store program code, the program code being used for performing the image rendering method according to the first aspect.

The present disclosure also provides a computer program product including instructions, the instructions, when run on a computer, causing the computer to perform the image rendering method according to the first aspect.

According to the foregoing technical solutions, the embodiments of this application have the following advantages.

The embodiments of this application provide an image rendering method. The method comprehensively considers effects such as shadows, specularity, and blocking in an image. For pixel positions (or pixels) in the image, picture effect indication values that can represent a final color display effect of the image are determined correspondingly, and a picture effect indication array is formed by using the picture effect indication values respectively corresponding to the pixel positions. When the image is rendered, a specified base image in a to-be-rendered picture and the picture effect indication array corresponding to the base image are obtained, and after the base image is rendered to a render texture object matching a screen size of a device to obtain a base texture map, a pixel value in the base texture map is adjusted by using the obtained picture effect indication array, so as to complete image rendering based on the adjusted pixel value. Compared with the image rendering method of superimposing and rendering effect maps based on the base texture map in the related art, in the image rendering method provided by the embodiments of this application, the pixel value in the base texture map is adjusted by using the picture effect indication array, to add a picture display effect, so that a process of rendering the effect maps is omitted, computing resources required to be consumed in an image rendering process are reduced correspondingly, and image rendering efficiency is effectively improved.

DESCRIPTION OF EMBODIMENTS

To make a person skilled in the art understand solutions of this application better, the following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

In the specification, claims, and accompanying drawings of this application, the terms "first", "second", "third", "fourth", and so on (if existing) are intended to distinguish between similar objects rather than describe a specific order or sequence. It is to be understood that the data termed in such a way are interchangeable in proper circumstances, so that the embodiments of this application described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

When image rendering is performed by using an image rendering method in the related art, effect maps such as shadows, specularity, and blocking usually need to be superimposed and rendered based on a picture background image. Superimposing and rendering various effect maps for so many times consume a large quantity of computing resources, causing reduction in the image rendering efficiency, and the effect maps obtained by rendering for a plurality of times also cause a waste of a storage space to some extent.

For the above technical problems, embodiments of this application provide an image rendering method. In the method, the effects such as shadows, specularity and blocking in the image are combined, and final color effect values of pixels in the image are represented by using a set of data (that is, a picture effect indication array); when performing image rendering on a to-be-rendered picture, the picture effect indication array is used for adjusting a pixel value in the base texture map. The base texture map is obtained by rendering the specified base image in the to-be-rendered picture to a render texture object matching a screen size of the device, so as to complete the image rendering on the to-be-rendered picture based on the adjusted pixel value. In this way, various effect maps do not need to be rendered for a plurality of times, thereby reducing the computing resources required to be consumed in the image rendering process, and effectively improving the image rendering efficiency; and, because a process of independently rendering the various effect maps for a plurality of times is omitted, a terminal device does not need to store the effect maps obtained through each time of rendering, thereby saving the storage space to some extent.

It is to be understood that, the image rendering method provided by the embodiments of this application can be applied to the terminal device having an image processing function, for example, a smartphone, a computer, a personal digital assistant (PDA), a tablet computer or the like.

For ease of understanding the technical solutions provided in the embodiments of this application, an application scenario to which the image rendering method provided in the embodiments of this application is applicable is described below.

Figure 1:
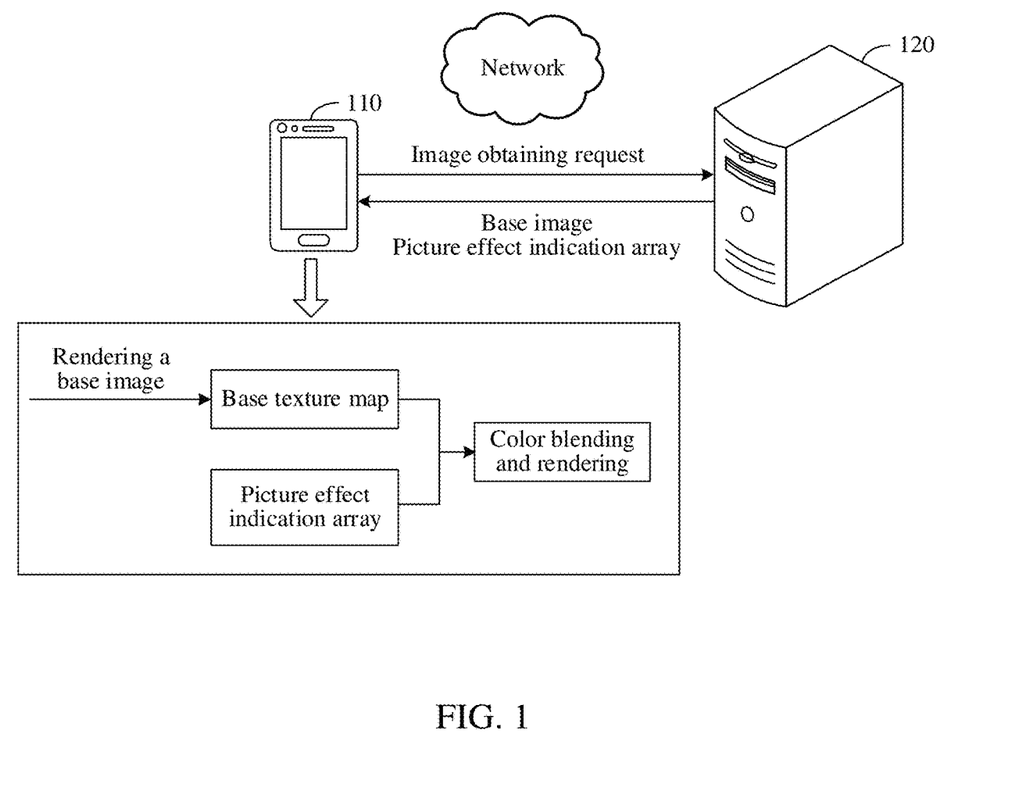
FIG. 1 is a schematic diagram of an application scenario of an image rendering method according to an embodiment of this application.

Referring to FIG. 1, FIG. 1 is a schematic diagram of an application scenario of an image rendering method according to an embodiment of this application. As shown in FIG. 1, the application scenario includes a terminal device 110 and a server 120, and the terminal device 110 communicates with the server 120 through a network; the server 120 is configured to provide a specified base image in a to-be-rendered picture and a picture effect indication array corresponding to the base image for the terminal device 110; the terminal device 110 is configured to perform the image rendering method provided by this embodiment of this application, to render and display the to-be-rendered picture on a screen of the terminal device based on the base image and the picture effect indication array corresponding to the base image that are provided by the server 120.

Specifically, the terminal device 110 can transmit an image obtaining request to the server 120 in a case that a related operation being triggered by a user is detected. After receiving the image obtaining request, the server 120 determines, based on the image obtaining request, the to-be-rendered picture currently to be rendered by the terminal device 110, and determines the specified base image in the to-be-rendered picture and the picture effect indication array corresponding to the base image, where the picture effect indication array includes a picture effect indication value corresponding to a pixel of the base image; and then transmits the determined base image and the determined picture effect indication array corresponding to the base image to the terminal device 110.

After receiving the base image and the picture effect indication array corresponding to the base image that are transmitted by the server 120, the terminal device 110 renders the base image to a render texture object matching a screen size of the terminal device, to obtain a base texture map; then adjusts the pixel value in the base texture map correspondingly by using the picture effect indication value in the received picture effect indication array, to obtain a pixel value corresponding to a final color display effect of the to-be-rendered picture; and finally, completes the image rendering based on the adjusted pixel value, to obtain an image with superimposed display effects such as shadows, specularity, and blocking.

In this way, a rendering process of various effect maps is omitted, thereby reducing the computing resources required to be consumed in the image rendering process, and greatly improving the image rendering efficiency. The embodiments in the present disclosure may make it not necessary for the terminal device to perform multiple independently rendering the various effect maps, so that the terminal device may not need to store the effect maps during the multiple rendering, thereby saving the storage space to some extent.

It is to be understood that the application scenario shown in FIG. 1 is merely an example. In actual applications, the terminal device can store the specified base image in the to-be-rendered picture and the picture effect indication array corresponding to the base image, and complete the image rendering directly based on the base image and the picture effect indication array corresponding to the base image that are stored in the terminal device without communicating with the server. No limitation is imposed herein on the application scenario to which the image rendering method provided by this embodiment of this application is applicable.

The following describes, through embodiments, image rendering methods provided in this application.

Figure 2:
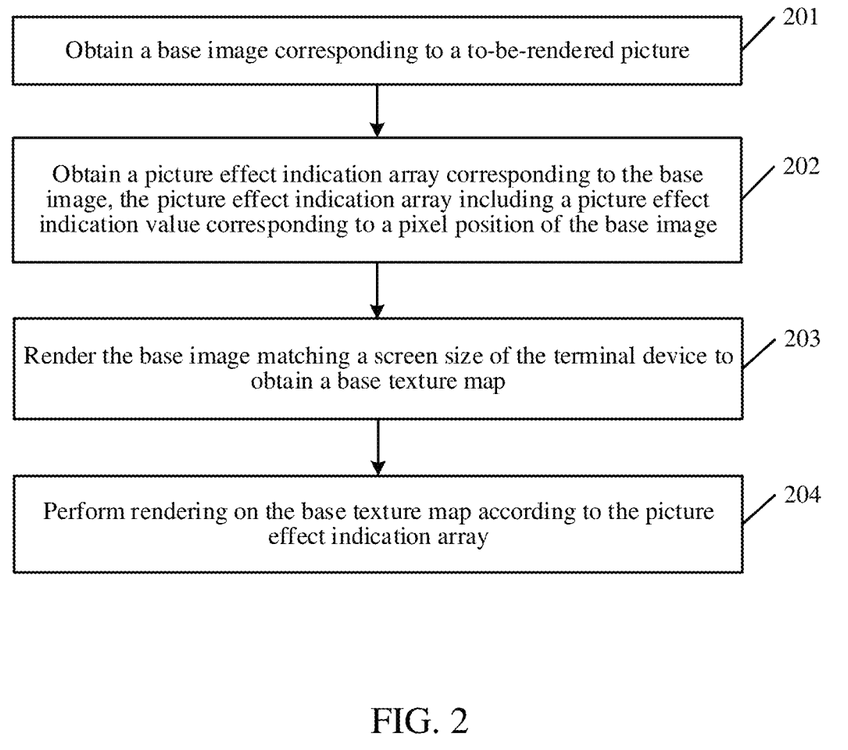
FIG. 2 is a schematic flowchart of an image rendering method according to an embodiment of this application.

FIG. 2 is a schematic flowchart of an image rendering method according to an embodiment of this application. As shown in FIG. 2, the image rendering method includes the following steps.

Step 201: Obtain a base image corresponding to a to-be-rendered picture. Optionally and alternatively, in another implementation, the step 201 may include obtaining a specified base image in a to-be-rendered picture.

In actual applications, after a terminal device detects that a user triggers a specified operation used for controlling the rendering and display of the to-be-rendered picture, the specified base image in the to-be-rendered picture is correspondingly obtained. In another implementation, the base image corresponding to the to-be-rendered picture is obtained by the terminal device.

The foregoing base image refers to a fixed picture background image in a to-be-rendered-and-displayed picture. In different application scenarios, different types of background images may be used as base images correspondingly. For example, in the scenario in which a game screen is rendered, a specified scene map in the to-be-rendered game screen may be used as a base image, and the type of the base image is not limited in this application.

In a possible implementation, the terminal device may communicate with a server, and obtain, from the server, the specified base image in the to-be-rendered picture. Specifically, after detecting that the user triggers the specified operation, the terminal device may correspondingly transmit an image obtaining request to the server; and after receiving the image obtaining request, the server determines, based on the image obtaining request, the to-be-rendered picture that is to be rendered currently by the terminal device, and returns the specified base image in the to-be-rendered picture to the terminal device.

Using an example in which the image rendering method provided by this embodiment of this application is applied to a game scene, when detecting that the user triggers a game interface jump operation, the terminal device correspondingly transmits the image obtaining request to the server; after receiving the image obtaining request, the server determines, based on the image obtaining request, a to-be-rendered game interface (that is, a game interface that is to be displayed after triggering the game interface jump operation) that is currently to be rendered, and obtains a specified scene map in the game interface as a base image, and then returns the base image to the terminal device.

In another possible implementation, the terminal device may retrieve a specified base image in the currently-to-be-rendered picture from data stored in the terminal device. Specifically, the terminal device may store base images corresponding to several pictures by using an internal memory of the terminal device. When the terminal device detects that the user triggers display of a picture, the terminal device correspondingly retrieves the specified base image in the picture from the internal memory of the terminal device.

Still using the example in which the image rendering method provided by this embodiment of this application is applied to the game scene, in a case that the terminal device has buffered the base image corresponding to the currently-to-be-rendered-and-displayed game interface, when detecting that the user triggers the operation of displaying the game interface, the terminal device may directly retrieve the specified base image in the game interface from a buffer of the terminal device.

It is to be understood that, the foregoing manner of obtaining the base image is merely an example. In actual applications, other manners may be further used for obtaining the base image by the terminal device, and the manner of obtaining the base image by the terminal device is not limited herein.

Step 202: Obtain a picture effect indication array corresponding to the base image. In one implementation, the picture effect indication array includes a picture effect indication value corresponding to a pixel of the base image. In another implementation, the picture effect indication array includes a plurality of picture effect indication values, each of which corresponds to a pixel of the base image.

After detecting that the user triggers the specified operation used for controlling the rendering and display of the to-be-rendered picture, besides needing to obtain the specified base image in the to-be-rendered picture, the terminal device further needs to obtain the picture effect indication array corresponding to the base image. The picture effect indication array includes the picture effect indication value corresponding to the pixel of the base image.

The picture effect indication value in the picture effect indication array is determined by comprehensively considering display effects such as shadows, specularity and blocking in the to-be-rendered picture. For example but not limited to, a picture effect indication value may include: a red (R) channel value indicating transparency, a green (G) channel value indicating specular brightness, and a blue (B) channel value indicating a shadow level. For an area that needs to be blocked in the to-be-rendered picture, an R channel value in the picture effect indication value of a corresponding position may be set to a value greater than 0, and/or lower transparency of a shelter indicates a smaller R channel value. For an area that needs to be specularly displayed in the to-be-rendered picture, a G channel value in the picture effect indication value of a corresponding position may be set to a value greater than 0, and higher specular brightness indicates a larger G channel value. For an area that is covered by a shadow in the to-be-rendered picture, a B channel value in the picture effect indication value of a corresponding position may be set to a value greater than 0, and a darker shadow indicates a larger B channel value.

In a possible implementation, the terminal device may communicate with the server, and obtain, from the server, the picture effect indication array corresponding to the base image. Specifically, after detecting that the user triggers the specified operation, the terminal device may transmit the image obtaining request to the server, to request the server to provide the specified base image in the to-be-rendered picture and the picture effect indication array corresponding to the base image simultaneously for the terminal device; and then receive the base image and the picture effect indication array corresponding to the base image that are returned by the server in response to the image obtaining request.

Certainly, in actual applications, the terminal device may alternatively obtain the base image from the server first, and then transmit, based on the base image, a picture effect indication array obtaining request to the server, to request the server to provide the picture effect indication array corresponding to the base image for the terminal device; and then receive the picture effect indication array returned by the server in response to the picture effect indication array obtaining request.

In another possible implementation, the terminal device may retrieve, from the data stored in the terminal device, the picture effect indication array corresponding to the base image. Specifically, the terminal device may store a plurality of base images and picture effect indication arrays corresponding to the base images by using the internal memory of the terminal device. After the terminal device detects that the user triggers the specified operation, the terminal device may retrieve the base images and the picture effect indication arrays corresponding to the base images simultaneously from the internal memory of the terminal device.

Certainly, in actual applications, the terminal device may alternatively retrieve the specified base image in the to-be-rendered picture first from the internal memory, and then retrieve, based on a correspondence between the base image and the picture effect indication array, the picture effect indication array corresponding to the base image from the internal memory of the terminal device.

It is to be understood that, the foregoing manner of obtaining the picture effect indication array corresponding to the base image is merely an example. In actual applications, other manners may be further used for obtaining the picture effect indication array by the terminal device, and the manner of obtaining the picture effect indication array by the terminal device is not limited herein.

Optionally, to further improve image rendering efficiency, the terminal device may obtain the picture effect indication array in the form of the image, to enable a graphics processing unit (GPU) to process the base image and the picture effect indication array in the form of the image simultaneously. Specifically, the terminal device obtains a picture effect indication image, the picture effect indication image carrying the picture effect indication array; and then reads a pixel value of each pixel from the picture effect indication image, and generates, according to the pixel value of the each pixel, the picture effect indication array corresponding to the picture effect indication image. That is, the picture effect indication array corresponding to the picture effect indication image includes pixel values of pixels read from the picture effect indication image.

During specific implementation, the picture effect indication image may be generated by the art production in advance, and a size of the picture effect indication image may be set to be the same as the size of the base image. For example, in the game scene, the size of the picture effect indication image may be set to be the same as the size of a game scene map. Then, according to the foregoing manner of setting the picture effect indication value, the pixel value in the picture effect indication image is set. That is, for an area that needs to be blocked, the R channel value in the pixel value corresponding to the area is set to be greater than 0; for an area that needs to be specularly displayed, the G channel value in the pixel value corresponding to the area is set to be greater than 0; and for an area to be covered by a shadow, the B channel value in the pixel value corresponding to the area is set to be greater than 0. Then, the picture effect indication image is scaled down to an appropriate size, for example, 1024*1024.

Then, the pixel values corresponding to the pixels are read from the picture effect indication image, that is, the R channel value, the G channel value and the B channel value in the pixel values at the pixels are read, and then the picture effect indication array corresponding to the picture effect indication image is formed according to a distribution status of the pixels by using the read pixel values.

Step 203: Render the base image matching a screen size of the terminal device to obtain a base texture map. Optionally and alternatively, the step 203 may include rendering the base image to a render texture object matching a screen size of the device, to obtain a base texture map.

After obtaining the base image, the terminal device does not directly render the base image to a FrameBuffer, but renders the base image to the render texture object such as Rendertexture matching the screen size of the terminal device. The render texture object belongs to one of frame buffer objects (FBO), so that the base texture map is obtained by rendering, that is, the base texture map displaying the base image is obtained. In the game scene, the base texture map is a map displaying the game scene map.

In the application scenario in which the game screen is rendered, besides needing to render the scene map to the render texture object matching the screen size of the device to obtain the base texture map, an object image generally needs to be further obtained, and the obtained object image is rendered to obtain the object map by using a screen post-processing mode.

It is to be understood that, the foregoing object image may be specifically a game character controlled by a player in a game screen, and may alternatively be a game character assigned by a system in a game screen, and an object corresponding to the object image is not specifically limited herein. A specific manner of obtaining the object image by the terminal device is similar to the foregoing manner of obtaining the base image and the picture effect indication array. The object image may be obtained by communicating with the server, or the object image may be obtained from the data buffered in the terminal device, and the manner of obtaining the object image is not limited herein either. In addition, there may be one or more object images obtained by the terminal device, and a quantity of object images obtained by the terminal device is not limited herein either.

After obtaining object images, the terminal device may render the obtained object images by using the screen post-processing mode, and obtain, after all the object images in the to-be-rendered picture are rendered, object maps including all the object images and matching the screen size of the device.

Furthermore, color blending needs to be further performed by the terminal device on the base texture map obtained by rendering the base image and the object map obtained by rendering the object image, to obtain a scene-and-object fusing map. Specifically, the terminal device may use an alpha channel value of the object map as a weighted value, and perform weighted averaging on the object map and the base texture map by using the weighted value, to obtain the scene-and-object fusing map.

Assuming that the base texture map is a map B and the object map is a map C, the scene-and-object fusing map obtained by performing color blending on the base texture map and the object map is a map D. When the terminal device specifically performs color fusion on the map B and map C, a formula (1) may be used for calculating pixel values in the map D:

$$Drgb = Brgb*(1-C_\alpha) + Crgb*C_\alpha \quad (1)$$

where Brgb is a pixel value in the map B, Crgb is a pixel value in the map C, Drgb is a pixel value in the map D, and $C_\alpha$ is an alpha channel value of the map C.

To prevent the area of an image rendered each time from being excessively large, and to reduce computing resources consumed in each rendering process, the specified base image in the to-be-rendered picture may be divided into N (N is an integer greater than or equal to 1) base image blocks; and then, when the base image is rendered to obtain a base texture map, a target base image block in a range of a current viewport may be selected from the N base image blocks, and the selected target base image block is rendered to the render texture object matching the screen size of the device, to obtain the base texture map.

Specifically, after obtaining the base image, the terminal device may divide the base image into N base image blocks according to a preset image division rule. When the base texture map is rendered, the terminal device may determine the range of the current viewport of the terminal device in advance, then select a base image block in the range of the viewport from the N base image blocks obtained through division, to serve as a target base image block, and then render the selected target base image block to the render texture object matching the screen size of the device, to obtain the base texture map.

It is to be understood that, the sizes of the N base image blocks obtained by the terminal device by dividing the base image may be the same or different, and the image division rule used by the terminal device is not limited herein.

Step 204: Perform rendering on the base texture map according to the picture effect indication array. Optionally and alternatively, the step 204 may include performing color blending and rendering on the base texture map according to the picture effect indication array.

After obtaining the base texture map by rendering, the terminal device may adjust the each pixel value in the base texture map correspondingly by using the picture effect indication value in the picture effect indication array obtained by the terminal device in step 202, and then complete the rendering on the to-be-rendered picture based on the adjusted pixel value, so as to display the picture with display effects such as shadows, specularity and blocking on the screen of the device.

In a case that the R channel value indicating transparency, the G channel value indicating specular brightness, and the B channel value indicating a shadow level are included in the picture effect indication value, the terminal device may specifically render the to-be-rendered picture by the following manner.

The B channel value (e.g., blue channel value) in the picture effect indication value is used as a color strength weighted value, and the each pixel value in the base texture map is weighted to obtain a corresponding weighted pixel value; the G channel value (e.g., green channel value) in the picture effect indication value is used as a specular incremental value, and incremental processing is performed on the each pixel value in the base texture map to obtain a corresponding incremental pixel value; the R channel value (e.g., red channel value) in the picture effect indication value is used as a transparency weighted value, and weighted averaging is performed on each incremental pixel value in the base texture map and each weighted pixel value in the base texture map, to obtain a to-be-rendered pixel value; and finally, picture rendering is performed based on the to-be-rendered pixel value.

Assuming that the picture effect indication value in the picture effect indication array is A and the base texture map is the map B, and the manner of determining each to-be-rendered pixel value in the to-be-rendered picture is described: the B channel value in A is used as a color strength weighted value Ab, and the pixel value Brgb of the corresponding position in the map B is weighted, to obtain a weighted pixel value Ab*Brgb; the G channel value in A is used as a specular incremental value Ag, and incremental processing is performed on the pixel value Brgb of the corresponding position in the map B, to obtain an incremental pixel value Brgb+Ag; and then, the R channel value in A is used as a transparency weighted value Ar, and based on a formula (2), weighted averaging is performed on the corresponding weighted pixel value and the corresponding incremental pixel value, to obtain the to-be-rendered pixel value:

$$(Brgb+Ag)*Ar + Brgb*Ab*(1-Ar) \quad (2)$$

It is to be understood that, in actual applications, besides determining the each to-be-rendered pixel value in the to-be-rendered picture based on the foregoing manner, the terminal device may further determines the each to-be-rendered pixel value by other manners, and an implementation of determining the to-be-rendered pixel value is not limited in this application.

As described in step 203, when the image rendering method provided by this embodiment of this application is applied to a scenario of rendering the game screen, besides needing to render the base image to obtain the base texture map, the each object image in the to-be-rendered picture further needs to be rendered to obtain the object map, and the color blending needs to be performed on the base texture map and the object map that are obtained by rendering, to obtain the scene-and-object fusing map. In this case, when the image rendering is performed on the to-be-rendered picture, color fusion needs to be performed on the scene-and-object fusing map and the base texture map according to the picture effect indication array, to facilitate completing the image rendering on the to-be-rendered picture based on the pixel value after color fusion.

Specifically, in a case that the R channel value indicating the transparency, the G channel value indicating the specular brightness, and the B channel value indicating the shadow level are included in the picture effect indication value, the terminal device may specifically implement the image rendering on the to-be-rendered picture by the following manner.

The B channel value in the picture effect indication value is used as the color strength weighted value, and the each pixel value in the scene-and-object fusing map is weighted to obtain a corresponding weighted pixel value; the G channel value in the picture effect indication value is used as the specular incremental value, and the incremental processing is performed on the each pixel value in the base texture map to obtain a corresponding incremental pixel value; the R channel value in the picture effect indication value is used as the transparency weighted value, and weighted averaging is performed on the each incremental pixel value in the base texture map and each weighted pixel value in the scene-and-object fusing map, to obtain a to-be-rendered pixel value; and finally, the picture rendering is performed based on the to-be-rendered pixel value.

Assuming that the picture effect indication value in the picture effect indication array is A, the base texture map is the map B, and the scene-and-object fusing map is the map D, the manner of determining the each to-be-rendered pixel value in the to-be-rendered picture is described in detail: the B channel value in A is used as the color strength weighted value Ab of a scene object layer (map D), and the pixel value Drgb of the corresponding position in the map D is weighted, to obtain a weighted pixel value Ab*Drgb; the G channel value in A is used as the specular incremental value Ag of a scene blocking layer (map B), and incremental processing is performed on the pixel value Brgb of the corresponding position in the map B, to obtain an incremental pixel value Brgb+Ag; and then, the R channel value in A is used as the transparency weighted value Ar of the scene blocking layer, and based on a formula (3), the weighted averaging is performed on the corresponding weighted pixel value and the corresponding incremental pixel value, to obtain the to-be-rendered pixel value:

$$(Brgb+Ag)*Ar+Drgb*Ab*(1-Ar) \quad (3)$$

It can be known according to the content of the related description in step 203 that, $Drgb=Brgb*(1-C_\alpha)+Crgb*C_\alpha$, which is substituted into the formula (3) to obtain the final representation form of the to-be-rendered pixel value, as shown in a formula (4):

$$(Brgb+Ag)*Ar+(Brgb*(1-C_\alpha)+Crgb*C_\alpha)*Ab*(1-Ar) \quad (4)$$

It is to be understood that, in actual applications, besides determining the each to-be-rendered pixel value in the to-be-rendered picture based on the foregoing manner, the terminal device may further determines the each to-be-rendered pixel value by other manners, and an implementation of determining the to-be-rendered pixel value is not limited in this application.

In the foregoing image rendering method, the effects such as shadows, specularity and blocking in the image are combined, and final color effect values of pixels in the image are represented by using a set of data (that is, a picture effect indication array); when performing image rendering on a to-be-rendered picture, the picture effect indication array is used for adjusting a pixel value in the base texture map. The base texture map is obtained by rendering the specified base image in the to-be-rendered picture to a render texture object matching a screen size of the device, so as to complete the image rendering on the to-be-rendered picture based on the adjusted pixel value. In this way, various effect maps do not need to be rendered for a plurality of times, thereby reducing the computing resources required to be consumed in the image rendering process, and effectively improving the image rendering efficiency; and, because a process of independently rendering the various effect maps for a plurality of times is omitted, a terminal device does not need to store the effect maps obtained through each time of rendering, thereby saving the storage space to some extent.

For ease of understanding the image rendering method provided in the embodiments of this application, using an example in which the image rendering method is applied to a scenario of rendering the game screen, an overall description is performed on the image rendering method.

Figure 3:
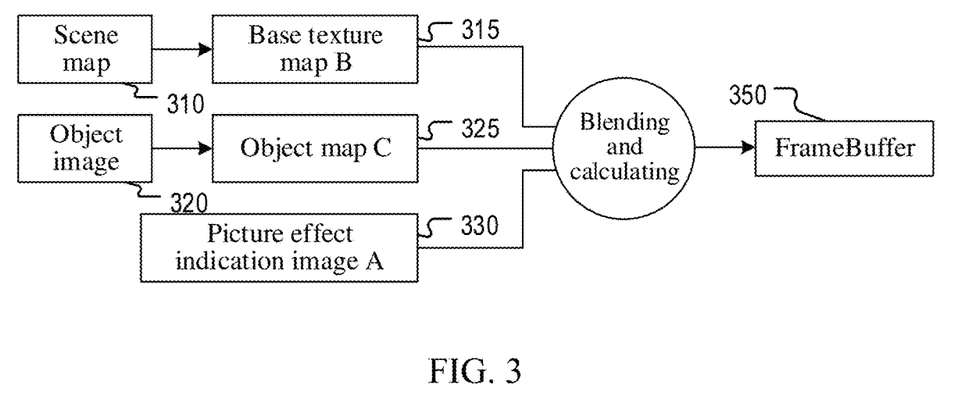
FIG. 3 is a schematic principle diagram of an image rendering method according to an embodiment of this application.

Referring to FIG. 3, FIG. 3 is a schematic principle diagram of an image rendering method according to an embodiment of this application. As shown in FIG. 3, a server may generate a picture effect indication image A 330 by the art production in advance, where the picture effect indication image A 330 carries a picture effect indication array corresponding to a game scene map 310, and the picture effect indication image A may be set to be the same size as the game scene map in size. Then, an area that needs to be blocked in the scene map is determined, the R channel value in the picture effect indication value of the corresponding position may be set to a value greater than 0, and lower transparency of a shelter indicates a smaller R channel value; an area that needs to be specularly displayed in the scene map is determined, a G channel value in the picture effect indication value of the corresponding position may be set to a value greater than 0, and higher specular brightness indicates a larger G channel value; an area that is covered by a shadow in the scene map is determined, the B channel value in the picture effect indication value of the corresponding position may be set to a value greater than 0, and a darker shadow indicates a larger B channel value; and then the image carrying the picture effect indication array is scaled down to an appropriate size, for example, the picture effect indication image A.

After detecting that the user triggers the specified operation in a process of using the game application, the terminal device transmits an image obtaining request to the server; and based on the image obtaining request, the server correspondingly determines the game screen to be rendered by the terminal device, and obtains and returns the scene map in the game screen, the object image 320 and the picture effect indication image A corresponding to the scene map to the terminal device.

After receiving the scene map 310, the object image 320 and the picture effect indication image A 330 corresponding to the scene map, the terminal device renders the scene map to the Rendertexture with the same size as the screen size of the terminal device to obtain a base texture map B 315; and renders the obtained object image by using the screen post-processing mode, and obtains, after completing the rendering on all the object images, an object map C 325 with the same size as the screen size of the device.

Figure 4:
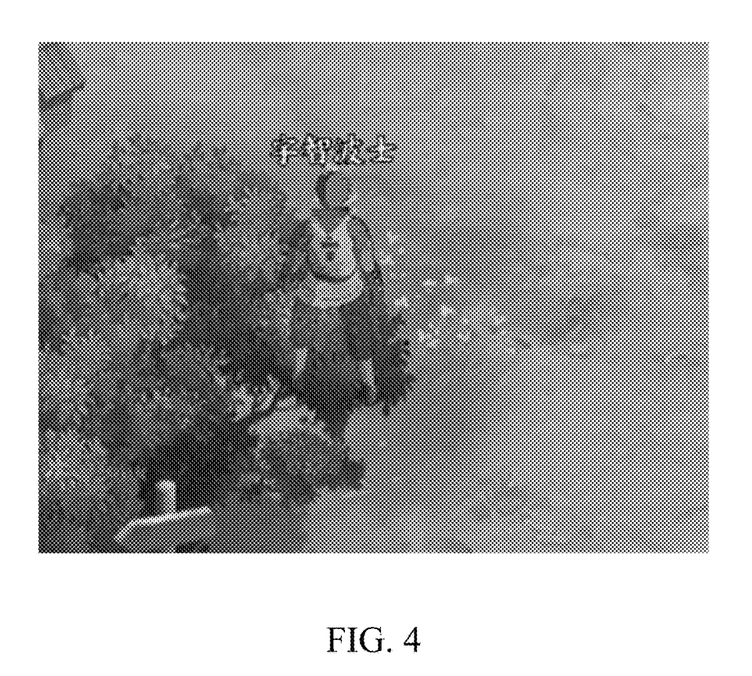
FIG. 4 is a game screen obtained through rendering of an image rendering method according to an embodiment of this application.

When the image rendering is performed eventually, the terminal device performs color blending on the base texture map B and the object map C in a fragment shader in advance, to obtain the scene-and-object fusing map D; that is, an alpha channel value Ca of the object map C is used as the weighted value to perform the weighted averaging on the base texture map B and the object map C, and the scene-and-object fusing map D being Brgb*(1−Ca)+Crgb*Ca is obtained. Then, the B channel value in the picture effect indication image A is used as the color strength weighted value Ab of a scene object layer, and the each pixel value in the scene-and-object fusing map D is weighted, to obtain a corresponding weighted pixel value Ab*Drgb; the G channel value in the picture effect indication image A is used as the specular incremental value Ag of a scene blocking layer, and incremental processing is performed on the each pixel value in the base texture map B, to obtain a corresponding incremental pixel value Brgb+Ag; and then, the R channel value in the picture effect indication image A is used as the transparency weighted value Ar of the scene blocking layer, and the weighted averaging is performed on the incremental pixel value Brgb+Ag and the weighted pixel value Ab*Drgb, to obtain the to-be-rendered pixel value Ar*(Brgb+Ag)+(1−Ar)*Ab*Drgb. The to-be-rendered pixel value is rendered to the FrameBuffer 350, to complete the rendering on the game screen. FIG. 4 is a schematic diagram of the game screen obtained through rendering of the foregoing image rendering method.

It is to be understood that, besides being used for rendering the game screen, the image rendering method provided by the embodiments of this application may also be used for rendering an animated picture, and may be further used for other image rendering scenes that require additional display effects, and the application scenario to which the image rendering method provided by the embodiments of this application is applicable is not limited herein.

Assuming that the game scene map is divided into N blocks and there is only one object in the game screen, when the image rendering method in the related art is used for performing image rendering, the object in the game screen needs to be drawn once, the scene map being divided into N blocks needs to be drawn for N times, a blocking layer being divided into N blocks needs to be drawn for N times, a specular layer being divided into N blocks needs to be drawn for N times, and a shadow layer being divided into N blocks needs to be drawn for N times. In this case, 4N+1 times of drawing need to be completed when rendering the game screen, pixels of about four full-screen sizes are outputted in total, and four full-screen-size images are loaded. Thus, in this case, the rendering efficiency is not good.

The embodiments in the present disclosure may significantly improve the rendering efficiency. For example, when the image is drawn by using the image rendering method provided in the embodiments of this application, an object in the game screen needs to be drawn once, none of the blocking layer, the shadow layer and the specular layer needs to be sketched individually, only one picture effect indication image is used for combining the foregoing display effect with the object and the scene map through a single time of drawing to obtain the final display effect. The full image rendering process requires only N+2 times of drawing, pixels of about one full-screen size are outputted, one full-screen-size image, one picture effect indication image and one object image are loaded, and the image rendering efficiency is significantly improved.

For the foregoing image rendering methods, this application further provides corresponding image rendering apparatuses, to apply and implement the image rendering methods in practice.

Figure 5:
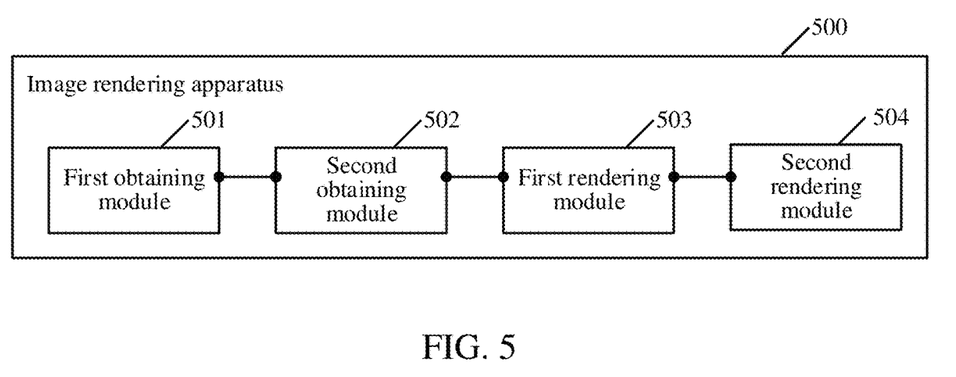
FIG. 5 is a schematic structural diagram of an image rendering apparatus according to an embodiment of this application.

Referring to FIG. 5, FIG. 5 is a schematic structural diagram of an image rendering apparatus 500 corresponding to the image rendering method shown in FIG. 2, and the image rendering apparatus 500 includes:

a first obtaining module 501, configured to obtain a specified base image in a to-be-rendered picture;

a second obtaining module 502, configured to obtain a picture effect indication array corresponding to the base image, the picture effect indication array including a picture effect indication value corresponding to a pixel of the base image;

a first rendering module 503, configured to render the base image to a render texture object matching a screen size of the device, to obtain a base texture map; and a second rendering module 504, configured to perform rendering on the base texture map according to the picture effect indication array. In another implementation, the second rendering module 504 may be configured to perform color rendering on the base texture map according to the picture effect indication array. In the present disclosure, a module may include a portion or all of the following components to perform a single function or a set of functions: one or more circuitry (for example but not limited to, memory, processor, sensor, wireless transmitter, wireless receiver, wired network connection, keyboard, mouse, graphic interface, touch-screen, speaker, microphone, finger print sensor, etc.), one or more instructions (for example but not limited to, computer readable code, computer readable instructions, etc.), and/or one or more mechanical device (for example but not limited to, motor, fan, relay, switch, etc.).

Optionally, based on the image rendering apparatus shown in FIG. 5, the first obtaining module 501 is specifically configured to:

obtain a picture effect indication image, the picture effect indication image carrying the picture effect indication array; and read, from the picture effect indication image, a pixel value of each pixel, and generate, according to the pixel value of the each pixel, the picture effect indication array corresponding to the picture effect indication image.

Optionally, based on the image rendering apparatus shown in FIG. 5, the picture effect indication value includes: a red channel value indicating transparency, a green channel value indicating specular brightness, and a blue channel value indicating a shadow level; and the second rendering module 504 is specifically configured to:

weight, by using the blue channel value in the picture effect indication value as a color strength weighted value, each pixel value in the base texture map, to obtain a corresponding weighted pixel value;

perform, by using the green channel value in the picture effect indication value as a specular incremental value, incremental processing on the each pixel value in the base texture map, to obtain a corresponding incremental pixel value;

perform, by using the red channel value in the picture effect indication value as a transparency weighted value, weighted averaging on each incremental pixel value in the base texture map and each weighted pixel value in the base texture map, to obtain a to-be-rendered pixel value; and perform picture rendering based on the to-be-rendered pixel value.

Figure 6:
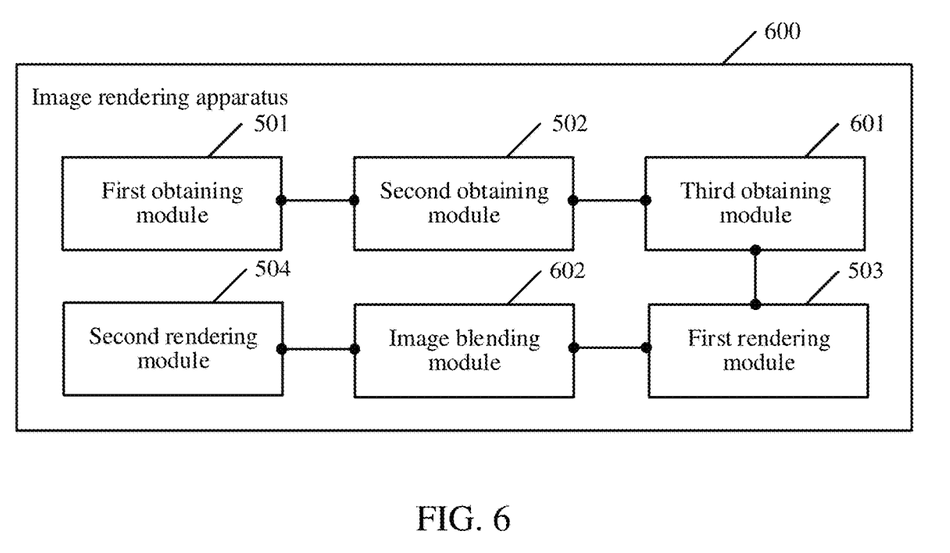
FIG. 6 is a schematic structural diagram of another image rendering apparatus according to an embodiment of this application.

Optionally, based on the image rendering apparatus shown in FIG. 5, the first obtaining module 501 is specifically configured to: obtain a specified scene map in the to-be-rendered picture of a game application as the base image. Referring to FIG. 6, FIG. 6 is a schematic structural diagram of another image rendering apparatus according to an embodiment of this application. As shown in FIG. 6, the apparatus further includes:

a third obtaining module 601, configured to obtain an object image, and render the object image to obtain an object map by using a screen post-processing mode; and an image blending module 602, configured to perform color blending on the base texture map and the object map, to obtain a scene-and-object fusing map; and the second rendering module 504 is specifically configured to perform color fusion on the scene-and-object fusing map and the base texture map according to the picture effect indication array.

Optionally, based on the image rendering apparatus shown in FIG. 6, the picture effect indication value includes: a red channel value indicating transparency, a green channel value indicating specular brightness, and a blue channel value indicating a shadow level;

the image blending module 602 is specifically configured to perform, by using an alpha channel value of the object map as a weighted value, weighted averaging on the object map and the base texture map, to obtain the scene-and-object fusing map; and the second rendering module 504 is specifically configured to:

weight, by using the blue channel value in the picture effect indication value as a color strength weighted value, each pixel value in the scene-and-object fusing map, to obtain a corresponding weighted pixel value;

perform, by using the green channel value in the picture effect indication value as a specular incremental value, incremental processing on each pixel value in the base texture map, to obtain a corresponding incremental pixel value;

perform, by using the red channel value in the picture effect indication value as a transparency weighted value, weighted averaging on each incremental pixel value in the base texture map and each weighted pixel value in the scene-and-object fusing map, to obtain a to-be-rendered pixel value; and perform picture rendering based on the to-be-rendered pixel value.

Figure 7:
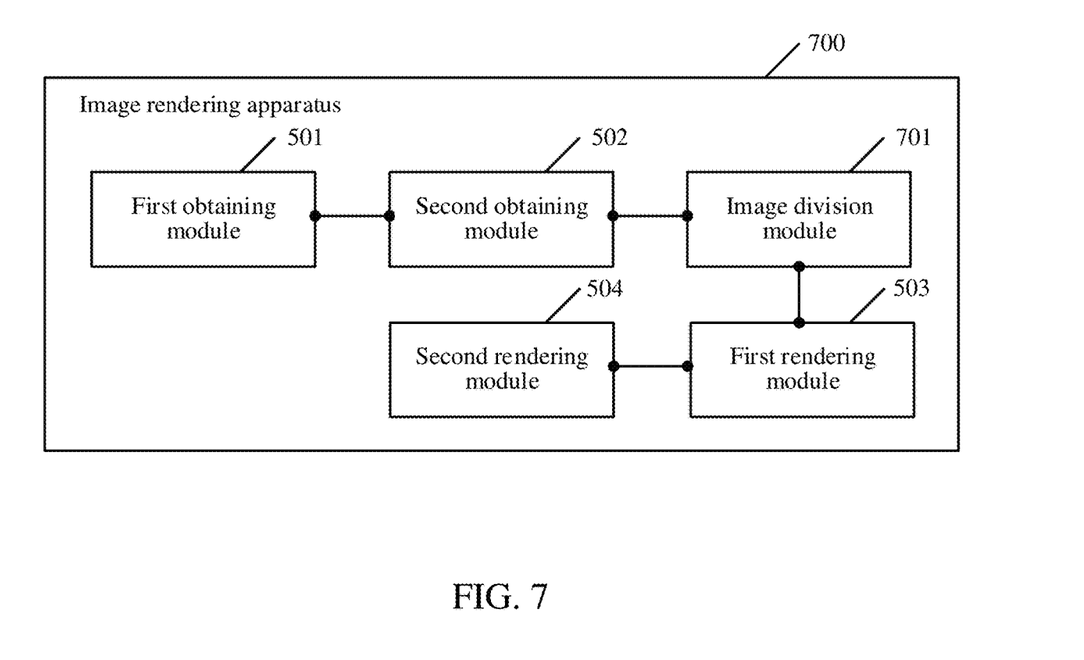
FIG. 7 is a schematic structural diagram of still another image rendering apparatus according to an embodiment of this application.

Optionally, based on the image rendering apparatus shown in FIG. 5, referring to FIG. 7, FIG. 7 is a schematic structural diagram of another image rendering apparatus according to an embodiment of this application. As shown in FIG. 7, the apparatus further includes:

an image division module 701, configured to divide the base image into N base image blocks; and the first rendering module 503 is specifically configured to:

select, from the N base image blocks, a target base image block in a range of a current viewport; and render the target base image block to the render texture object matching the screen size of the device, to obtain the base texture map.

In the foregoing image rendering apparatus, the effects such as shadows, specularity and blocking in the image are combined, and final color effect values of pixels in the image are represented by using a set of data (that is, a picture effect indication array); when performing image rendering on a to-be-rendered picture, the picture effect indication array is used for adjusting a pixel value in the base texture map. The base texture map is obtained by rendering the specified base image in the to-be-rendered picture to a render texture object matching a screen size of the device, so as to complete the image rendering on the to-be-rendered picture based on the adjusted pixel value. In this way, various effect maps do not need to be rendered for a plurality of times, thereby reducing the computing resources required to be consumed in the image rendering process, and effectively improving the image rendering efficiency; and, because a process of independently rendering the various effect maps for a plurality of times is omitted, a terminal device does not need to store the effect maps obtained through each time of rendering, thereby saving the storage space to some extent.

An embodiment of this application further provides a terminal device for image rendering. The terminal device for image rendering provided in this embodiment of this application is described below from the perspective of hardware substantiation.

Figure 8:
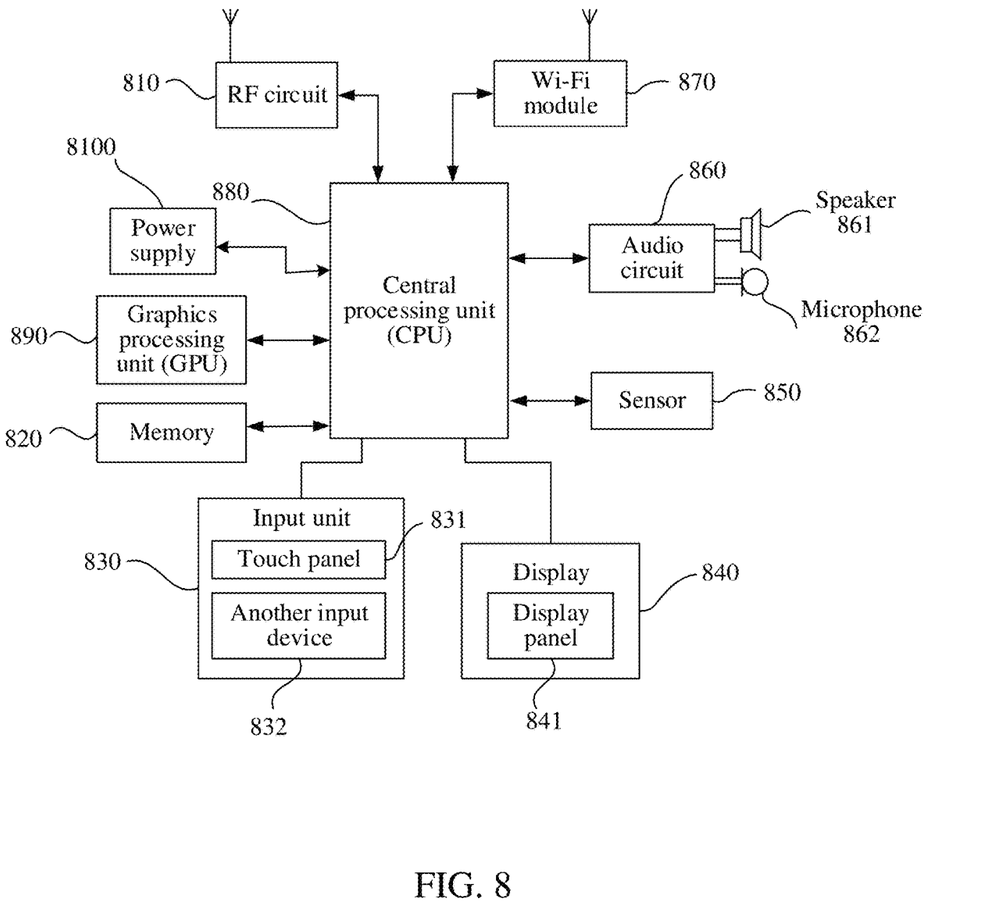
FIG. 8 is a schematic structural diagram of a terminal device according to an embodiment of this application.

Referring to FIG. 8, FIG. 8 is a schematic structural diagram of a terminal device according to an embodiment of this application. For ease of description, only a part related to this embodiment of this application is shown. For a specific technical detail not disclosed, refer to the method part in the embodiments of this application. The terminal may be any terminal device such as a computer, a tablet computer, or a personal digital assistant (PDA). An example in which the terminal is a mobile phone is used.

FIG. 8 is a block diagram of a part of a structure of the mobile phone related to the terminal according to this embodiment of this application. Referring to FIG. 8, the mobile phone includes: components such as a radio frequency (RF) circuit 810, a memory 820, an input unit 830 (including a touch panel 831 and another input device 832), a display 840 (including a display panel 841), a sensor 850, an audio circuit 860 (including a speaker 861 and a microphone 862), a wireless fidelity (Wi-Fi) module 870, a central processing unit (CPU) 880, a GPU 890 and a power supply 8100. A person skilled in the art may understand that the structure of the mobile phone shown in FIG. 8 does not constitute a limitation on the mobile phone, and the mobile phone may include more components or fewer components than those shown in the figure, or some components may be combined, or a different component deployment may be used.

The memory 820 may be configured to store a software program and module. The CPU 880 runs the software program and module stored in the memory 820, to implement various functional applications and data processing of the mobile phone. The memory 820 may mainly include a program storage area and a data storage area. The program storage area may store an operating system, an application program required by at least one function (such as a sound playback function and an image display function), and the like. The data storage area may store data (such as audio data and an address book) created according to the use of the terminal, and the like. In addition, the memory 820 may include a high speed random access memory, and may further include a non-volatile memory, such as at least one magnetic disk storage device, a flash memory, or another volatile solid storage device.

The CPU 880 is a control center of the mobile phone, and is connected to various parts of the entire mobile phone by using various interfaces and lines. By running or executing a software program and/or module stored in the memory 820, and invoking data stored in the memory 820, the processor executes various functions of the mobile phone and performs data processing, thereby monitoring the entire mobile phone. Optionally, the CPU 880 may include one or more processing units. Preferably, the CPU 880 may integrate an application processor and a modem processor. The application processor mainly processes an operating system, a user interface, an application program, and the like. The modem processor mainly processes wireless communication. It may be understood that the foregoing modem processor may alternatively not be integrated into the processor 880.

In this embodiment of this application, when picture rendering needs to be performed, the CPU 880 controls the GPU 890 to perform the following operations:

obtaining a base image corresponding to a to-be-rendered picture or obtaining a specified base image in a to-be-rendered picture;

obtaining a picture effect indication array corresponding to the base image, the picture effect indication array comprising a picture effect indication value corresponding to a pixel of the base image;

rendering the base image to a render texture object matching a screen size of the device, to obtain a base texture map; and performing rendering on the base texture map according to the picture effect indication array or performing color rendering on the base texture map according to the picture effect indication array.

Optionally, the GPU 890 is further configured to perform steps of any implementation of the image rendering method provided by the embodiments of this application. Furthermore, under the control of the GPU 890, the image picture is displayed by the display 840.

An embodiment of this application further provides a computer-readable storage medium, configured to store a computer program, the computer program being configured to perform any implementation in an image rendering method described in the foregoing embodiments.

An embodiment of this application further provides a computer program product including instructions, the instructions, when run on a computer, causing the computer to perform any implementation in an image rendering method described in the foregoing embodiments.

In some embodiments, the foregoing terminal or server may be a node in a distributed system, where the distributed system may be a blockchain system, and the blockchain system may be a distributed system formed by connecting a plurality of nodes through network communication. A peer to peer (P2P) network may be formed among the nodes, and a computing device in any form such as a server, a terminal or another electronic device may become a node in the blockchain system by joining the P2P network.

A person skilled in the art may clearly understand that, for the purpose of convenient and brief description, for specific work processes of the foregoing described system, apparatus, and unit, reference may be made to corresponding processes in the foregoing method embodiments, and details are not described herein again.

In the embodiments provided in this application, it is to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatus or units may be implemented in electronic, mechanical, or other forms.

The units described as separate parts may or may not be physically separate, and the parts displayed as units may or may not be physical units, may be located in one position, or may be distributed on multiple network units. Some or all of the units can be selected according to actual requirements to achieve the objectives of the solutions in the embodiments.

In addition, functional units in the embodiments of this application can be integrated into one processing unit, or each of the units can exist alone physically, or two or more units are integrated into one unit. The foregoing integrated unit can be implemented in the form of hardware, or can be implemented in the form of a software function unit.

When the integrated unit is implemented in the form of a software functional unit and sold or used as an independent product, the integrated unit may be stored in a computer-readable storage medium. Based on such an understanding, the technical solutions of this application essentially, or the part contributing to the related technology, or all or some of the technical solutions may be implemented in the form of a software product. The computer software product is stored in a storage medium and includes a plurality of instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely provided for describing the technical solutions of this application, but not intended to limit this application. A person of ordinary skill in the art shall understand that although this application has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of this application.

What is claimed is:

1. A method for rendering an image, the method comprising:

obtaining, by a terminal device comprising a memory storing instructions and a processor in communication with the memory, a base image corresponding to a to-be-rendered picture;

obtaining, by the terminal device, a picture effect indication array corresponding to the base image, the picture effect indication array comprising a picture effect indication value corresponding to a pixel of the base image, by:
  obtaining a picture effect indication image, the picture effect indication image carrying the picture effect indication array,
  reading, from the picture effect indication image, a pixel value of each pixel of the picture effect indication image, and
  generating, according to the pixel value of the each pixel of the picture effect indication image, the picture effect indication array;
rendering, by the terminal device, the base image matching a screen size of the terminal device to obtain a base texture map; and
performing, by the terminal device, rendering on the base texture map according to the picture effect indication array.

2. The method according to claim 1, wherein:
the picture effect indication value comprises:
  a red channel value indicating transparency,
  a green channel value indicating specular brightness, and
  a blue channel value indicating a shadow level.

3. The method according to claim 2, wherein the performing rendering on the base texture map according to the picture effect indication array comprises:
  weighting, by using the blue channel value in the picture effect indication value as a color strength weighted value, each pixel value in the base texture map, to obtain a corresponding weighted pixel value;
  performing, by using the green channel value in the picture effect indication value as a specular incremental value, incremental processing on the each pixel value in the base texture map, to obtain a corresponding incremental pixel value;
  performing, by using the red channel value in the picture effect indication value as a transparency weighted value, weighted averaging on each incremental pixel value in the base texture map and each weighted pixel value in the base texture map, to obtain a to-be-rendered pixel value; and
  performing picture rendering based on the to-be-rendered pixel value.

4. The method according to claim 1, wherein:
the obtaining the base image corresponding to the to-be-rendered picture comprises:
  obtaining a specified scene map in the to-be-rendered picture of a game application as the base image;
the method further comprises:
  obtaining an object image, and rendering the object image to obtain an object map by using a screen post-processing mode, and
  performing color blending on the base texture map and the object map, to obtain a scene-and-object fusing map; and
the performing rendering on the base texture map according to the picture effect indication array comprises:
  performing color fusion on the scene-and-object fusing map and the base texture map according to the picture effect indication array.

5. The method according to claim 4, wherein:
the picture effect indication value comprises: a red channel value indicating transparency, a green channel value indicating specular brightness, and a blue channel value indicating a shadow level;
the performing color blending on the base texture map and the object map, to obtain the scene-and-object fusing map comprises:
  performing, by using an alpha channel value of the object map as a weighted value, weighted averaging on the object map and the base texture map, to obtain the scene-and-object fusing map; and
the performing color fusion on the scene-and-object fusing map and the base texture map according to the picture effect indication array comprises:
  weighting, by using the blue channel value in the picture effect indication value as a color strength weighted value, each pixel value in the scene-and-object fusing map, to obtain a corresponding weighted pixel value,
  performing, by using the green channel value in the picture effect indication value as a specular incremental value, incremental processing on each pixel value in the base texture map, to obtain a corresponding incremental pixel value,
  performing, by using the red channel value in the picture effect indication value as a transparency weighted value, weighted averaging on each incremental pixel value in the base texture map and each weighted pixel value in the scene-and-object fusing map, to obtain a to-be-rendered pixel value, and
  performing picture rendering based on the to-be-rendered pixel value.

6. The method according to claim 1, wherein:
after the obtaining the base image corresponding to the to-be-rendered picture, the method further comprises:
  dividing the base image into N base image blocks; and
the rendering the base image matching the screen size of the terminal device to obtain the base texture map comprises:
  selecting, from the N base image blocks, a target base image block in a range of a current viewport, and
  rendering the target base image block to a render texture object matching the screen size of the terminal device, to obtain the base texture map.

7. An apparatus for rending an image, the apparatus comprising:
  a memory storing instructions; and
  a processor in communication with the memory, wherein, when the processor executes the instructions, the processor is configured to cause the apparatus to:
    obtain a base image corresponding to a to-be-rendered picture,
    obtain a picture effect indication array corresponding to the base image, the picture effect indication array comprising a picture effect indication value corresponding to a pixel of the base image, by:
  obtaining a picture effect indication image, the picture effect indication image carrying the picture effect indication array,
  reading, from the picture effect indication image, a pixel value of each pixel of the picture effect indication image, and
  generating, according to the pixel value of the each pixel of the picture effect indication image, the picture effect indication array,
    render the base image matching a screen size of the apparatus to obtain a base texture map, and
    perform rendering on the base texture map according to the picture effect indication array.

8. The apparatus according to claim 7, wherein:
the picture effect indication value comprises:

a red channel value indicating transparency,
a green channel value indicating specular brightness, and
a blue channel value indicating a shadow level.

9. The apparatus according to claim 8, wherein, when the processor is configured to cause the apparatus to perform rendering on the base texture map according to the picture effect indication array, the processor is configured to cause the apparatus to:
weight, by using the blue channel value in the picture effect indication value as a color strength weighted value, each pixel value in the base texture map, to obtain a corresponding weighted pixel value;
perform, by using the green channel value in the picture effect indication value as a specular incremental value, incremental processing on the each pixel value in the base texture map, to obtain a corresponding incremental pixel value;
perform, by using the red channel value in the picture effect indication value as a transparency weighted value, weighted averaging on each incremental pixel value in the base texture map and each weighted pixel value in the base texture map, to obtain a to-be-rendered pixel value; and
perform picture rendering based on the to-be-rendered pixel value.

10. The apparatus according to claim 7, wherein:
when the processor is configured to cause the apparatus to obtain the base image corresponding to the to-be-rendered picture, the processor is configured to cause the apparatus to:
obtain a specified scene map in the to-be-rendered picture of a game application as the base image;
when the processor executes the instructions, the processor is configured to further cause the apparatus to:
obtain an object image, and rendering the object image to obtain an object map by using a screen post-processing mode, and
perform color blending on the base texture map and the object map, to obtain a scene-and-object fusing map; and
when the processor is configured to cause the apparatus to perform rendering on the base texture map according to the picture effect indication array, the processor is configured to cause the apparatus to:
perform color fusion on the scene-and-object fusing map and the base texture map according to the picture effect indication array.

11. The apparatus according to claim 10, wherein:
the picture effect indication value comprises: a red channel value indicating transparency, a green channel value indicating specular brightness, and a blue channel value indicating a shadow level;
when the processor is configured to cause the apparatus to perform color blending on the base texture map and the object map, to obtain the scene-and-object fusing map, the processor is configured to cause the apparatus to:
perform, by using an alpha channel value of the object map as a weighted value, weighted averaging on the object map and the base texture map, to obtain the scene-and-object fusing map; and
when the processor is configured to cause the apparatus to perform color fusion on the scene-and-object fusing map and the base texture map according to the picture effect indication array, the processor is configured to cause the apparatus to:
weight, by using the blue channel value in the picture effect indication value as a color strength weighted value, each pixel value in the scene-and-object fusing map, to obtain a corresponding weighted pixel value,
perform, by using the green channel value in the picture effect indication value as a specular incremental value, incremental processing on each pixel value in the base texture map, to obtain a corresponding incremental pixel value,
perform, by using the red channel value in the picture effect indication value as a transparency weighted value, weighted averaging on each incremental pixel value in the base texture map and each weighted pixel value in the scene-and-object fusing map, to obtain a to-be-rendered pixel value, and
perform picture rendering based on the to-be-rendered pixel value.

12. The apparatus according to claim 7, wherein:
after the processor is configured to cause the apparatus to obtain the base image corresponding to the to-be-rendered picture, the processor is configured to further cause the apparatus to:
divide the base image into N base image blocks; and
when the processor is configured to cause the apparatus to render the base image matching the screen size of the apparatus to obtain the base texture map, the processor is configured to cause the apparatus to:
select, from the N base image blocks, a target base image block in a range of a current viewport, and
render the target base image block to a render texture object matching the screen size of the apparatus, to obtain the base texture map.

13. A non-transitory computer-readable storage medium storing computer readable instructions, wherein, the computer readable instructions, when executed by a processor, are configured to cause the processor to perform:
obtaining a base image corresponding to a to-be-rendered picture;
obtaining a picture effect indication array corresponding to the base image, the picture effect indication array comprising a picture effect indication value corresponding to a pixel of the base image, by:
obtaining a picture effect indication image, the picture effect indication image carrying the picture effect indication array,
reading, from the picture effect indication image, a pixel value of each pixel of the picture effect indication image, and
generating, according to the pixel value of the each pixel of the picture effect indication image, the picture effect indication array;
rendering the base image matching a screen size of a device to obtain a base texture map; and
performing rendering on the base texture map according to the picture effect indication array.

14. The non-transitory computer readable storage medium according to claim 13, wherein:
the picture effect indication value comprises:
a red channel value indicating transparency,
a green channel value indicating specular brightness, and
a blue channel value indicating a shadow level.

15. The non-transitory computer readable storage medium according to claim 14, wherein, when the computer readable instructions are configured to cause the processor to perform performing rendering on the base texture map according to the picture effect indication array, the computer readable instructions are configured to cause the processor to perform:

weighting, by using the blue channel value in the picture effect indication value as a color strength weighted value, each pixel value in the base texture map, to obtain a corresponding weighted pixel value;

performing, by using the green channel value in the picture effect indication value as a specular incremental value, incremental processing on the each pixel value in the base texture map, to obtain a corresponding incremental pixel value;

performing, by using the red channel value in the picture effect indication value as a transparency weighted value, weighted averaging on each incremental pixel value in the base texture map and each weighted pixel value in the base texture map, to obtain a to-be-rendered pixel value; and     performing picture rendering based on the to-be-rendered pixel value.

16. The non-transitory computer readable storage medium according to claim 13, wherein:

when the computer readable instructions are configured to cause the processor to perform obtaining the base image corresponding to the to-be-rendered picture, the computer readable instructions are configured to cause the processor to perform:

obtaining a specified scene map in the to-be-rendered picture of a game application as the base image;

the computer readable instructions, when executed by the processor, are configured to further cause the processor to perform:

obtaining an object image, and rendering the object image to obtain an object map by using a screen post-processing mode, and         performing color blending on the base texture map and the object map, to obtain a scene-and-object fusing map; and     when the computer readable instructions are configured to cause the processor to perform performing rendering on the base texture map according to the picture effect indication array, the computer readable instructions are configured to cause the processor to perform:

performing color fusion on the scene-and-object fusing map and the base texture map according to the picture effect indication array.

17. The non-transitory computer readable storage medium according to claim 16, wherein:

the picture effect indication value comprises: a red channel value indicating transparency, a green channel value indicating specular brightness, and a blue channel value indicating a shadow level;

when the computer readable instructions are configured to cause the processor to perform performing color blending on the base texture map and the object map, to obtain the scene-and-object fusing map, the computer readable instructions are configured to cause the processor to perform:

performing, by using an alpha channel value of the object map as a weighted value, weighted averaging on the object map and the base texture map, to obtain the scene-and-object fusing map; and     when the computer readable instructions are configured to cause the processor to perform performing color fusion on the scene-and-object fusing map and the base texture map according to the picture effect indication array, the computer readable instructions are configured to cause the processor to perform:

weighting, by using the blue channel value in the picture effect indication value as a color strength weighted value, each pixel value in the scene-and-object fusing map, to obtain a corresponding weighted pixel value,         performing, by using the green channel value in the picture effect indication value as a specular incremental value, incremental processing on each pixel value in the base texture map, to obtain a corresponding incremental pixel value,         performing, by using the red channel value in the picture effect indication value as a transparency weighted value, weighted averaging on each incremental pixel value in the base texture map and each weighted pixel value in the scene-and-object fusing map, to obtain a to-be-rendered pixel value, and         performing picture rendering based on the to-be-rendered pixel value.

\* \* \* \* \*